United States Patent
Jeong et al.

(10) Patent No.: US 8,846,852 B2
(45) Date of Patent: Sep. 30, 2014

(54) POLYIMIDE FILM

(75) Inventors: Young Han Jeong, Daegu (KR); Han Moon Cho, Suwon-si (KR); Hyo Jun Park, Yongin-si (KR)

(73) Assignee: Kolon Industries, Inc., Gwacheon-si (KR)

( * ) Notice: Subject to any disclaimer, the term of this patent is extended or adjusted under 35 U.S.C. 154(b) by 39 days.

(21) Appl. No.: 13/142,761

(22) PCT Filed: Dec. 30, 2009

(86) PCT No.: PCT/KR2009/007946
§ 371 (c)(1),
(2), (4) Date: Sep. 30, 2011

(87) PCT Pub. No.: WO2010/077084
PCT Pub. Date: Jul. 8, 2010

(65) Prior Publication Data
US 2012/0041156 A1 Feb. 16, 2012

(30) Foreign Application Priority Data

Dec. 30, 2008 (KR) .......... 10-2008-0136314
Dec. 29, 2009 (KR) .......... 10-2009-0132417

(51) Int. Cl.
C08G 73/10 (2006.01)
C09D 179/08 (2006.01)
C08J 5/18 (2006.01)

(52) U.S. Cl.
CPC ......... *C06G 73/1039* (2013.01); *C08J 2379/08* (2013.01); *C09D 179/08* (2013.01); *C08J 5/18* (2013.01); *C08G 73/1042* (2013.01)
USPC .......... 528/353; 428/1.26; 428/220; 528/170; 528/310

(58) Field of Classification Search
USPC .................. 428/1.26, 220; 528/170, 310, 353
See application file for complete search history.

(56) References Cited

U.S. PATENT DOCUMENTS

2005/0221023 A1* 10/2005 Sakamoto et al. ............. 428/1.3
2010/0255221 A1* 10/2010 Jung et al. .................... 428/1.26

FOREIGN PATENT DOCUMENTS

WO   WO 2009028862   *   2/2009

* cited by examiner

*Primary Examiner* — Gregory Listvoyb
(74) *Attorney, Agent, or Firm* — Sughrue Mion, PLLC

(57) ABSTRACT

The present invention provides a polyimide film which is both outstandingly transparent and highly heat resistance, and which can be usefully employed as a transparent electrically conductive film, a TFT substrate, a flexible printed circuit substrate, and the like.

13 Claims, No Drawings

POLYIMIDE FILM

TECHNICAL FIELD

The present invention relates to a polyimide film, which is colorless and transparent, and has an excellent heat resistant.

BACKGROUND ART

A polyimide resin, which is an insoluble and nonmeltable resin having ultrahigh heat resistance, is widely used in heat-resistant state-of-the-art materials for automobiles, aircrafts, spacecrafts, and the like, and electronic materials, such as insulating coating agents, insulating films, semiconductors, electrode protection films of TFT-LCD, and the like, because it has excellent properties, such as heat oxidation resistance, heat resistance, radiation resistance, low-temperature characteristics, chemical resistance, and the like. Recently, it is used in a transparent electrode film, and the like by surface-coating or containing a conductive filler in a film and marking material, such as optical fiber or liquid crystal alignment layer.

However, a general polyimide resin is colored brown or yellow because of its high aromatic ring density so that it has low transmittance in the visible light range and comes in some colors like yellow thereby reducing light transmittance with the result that it is difficult to use it in applications requiring transparency.

For this reason, there are diversely efforts to improve a color and a transmittance of a polyimide film, but there are two aspects as the results of the above efforts, that is, a heat resistance is reduced in proportion to the improvements of color and transmittance of film.

Furthermore, a transparent film having high heat resistance as well as a diversification of function is required for applications as various electrical and electronic materials applied with a polyimide film.

DISCLOSURE

Technical Problem

An object of the present invention is to provide a polyimide film having an excellent heat resistance while it is contented with a transparency.

An embodiment of the present invention provides a polyimide powder, which is imides of polyamic acid obtained by polymerizing diamines and acid dianhydrides, in which it has an absolute molecular weight (Mw) of 40,000 to 150,000, determined by the following Formula 1, and a degree of imidization of at least 80%:

$$\frac{R_\theta}{K^*c} = MP(\theta) - 2A_2cM^2P^2(\theta) \quad \text{[Formula 1]}$$

[wherein, the above Formula 1 is induced from a principle determining molar mass and size of polymer from angular variation and amount of scattered light measured by an irradiation of laser light to a solution containing any polymer and solvent, using a principle that the amount of charge transfer and the amount of light emission are depended on a polarizability of material for the phenomenon, of which a polarizing is occurred according to an interaction between the material and light, and hence light is scattered in all directions by oscillating charges;

$R_\theta$ is the excess Rayleigh ratio;

$K^* = 4\pi^2 n_0^2 (dn/dc)^2 \lambda_0^{-4} N_A^{-1}$, here $n_0$ is a refractive index of solvent, $N_A$ is Avogadro's number, and do/dc is a specific refractive index increment, that is differentiated from a change rate of refractive index changed according to a change rate of concentration of dilute solution and is determined within the range of 0.001 to 0.1 g/ml as a concentration change section, when a refractive index is detected by injecting a polyimide powder in a state of dilute solution in an organic solvent into a flow cell of differential refractometer;

c is a polymer concentration (g/ml) in a solution;

M is molar mass, and weight average molecular weight (Mw) in the case of polydisperse sample;

$A_2$ is the second virial coefficient; and $P(\theta) = R_\theta / R_0$]

The polyimide powder according to an embodiment of the present invention may have an absolute molecular weight (Mw) of 50,000 to 150,000.

For the polyimide powder according to an embodiment of the present invention, its polydispersity index of absolute molecular weight may be 1.1 to 1.5, and for a preferable embodiment, it may be 1.1 to 1.3.

For the polyimide powder according to an embodiment of the present invention, acid dianhydrides may include 2,2-bis(3,4-dicarboxyphenyl)hexafluoropropane dianhydride. At this time, 2,2-bis(3,4-dicarboxyphenyl)hexafluoropropane dianhydride may be included in 30 mol % to 100 mol % in the acid dianhydrides.

For the polyimide powder according to an embodiment of the present invention, diamines may include 2,2'-bis(trifluoromethyl)-4,4'-diaminobiphenyl. At this time, 2,2'-bis(trifluoromethyl)-4,4'-diaminobiphenyl may be included in 20 mol % to 100 mol % in the diamines.

For the polyimide powder according to an embodiment of the present invention, the imides of polyamic acid may be imides of polyamic acid obtained by firstly injecting 2,2-bis(3,4-dicarboxyphenyl)hexafluoropropane dianhydride out of the acid dianhydrides.

For the polyimide powder according to another embodiment of the present invention, the imides of polyamic acid may be imides of polyamic acid obtained by finally injecting 2,2-bis(3,4-dicarboxyphenyl)hexafluoropropane dianhydride out of the acid dianhydrides.

For the polyimide powder according to an embodiment of the present invention, a polymerization may be performed for 1 hour to 24 hours.

For the polyimide powder according to an embodiment of the present invention, the polymerization may be performed for 8 hours to 12 hours. An embodiment of the present invention provides a method for producing a polyimide powder, comprising:

obtaining a polyamic acid solution by polymerizing diamines and acid dianhydrides in an organic solvent;

producing a solution containing imides by an imidization to be the degree of imidization of at least 80% by injecting a chemical conversion agent to the polyamic acid solution;

precipitating by adding a solvent selected from methyl alcohol, ethyl alcohol, isopropyl alcohol, ethylene glycol, triethylene glycol, 2-butyl alcohol, 2-propyl alcohol, 2-hexyl alcohol, cyclopentyl alcohol, cyclohexyl alcohol, phenol, and t-butyl alcohol to the solution containing imides; and filtering solids precipitated from the above step;

in which the polyimide powder has the degree of imidization of at least 80% and an absolute molecular weight (Mw) of 40,000 to 150,000, determined by the following Formula 1:

$$\frac{R_\theta}{K^*c} = MP(\theta) - 2A_2cM^2P^2(\theta) \quad \text{[Formula 1]}$$

[wherein, the above Formula 1 is induced from a principle determining molar mass and size of polymer from angular variation and amount of scattered light measured by an irradiation of laser light to a solution containing any polymer and solvent, using a principle that the amount of charge transfer and the amount of light emission are depended on a polarizability of material for the phenomenon, of which a polarizing is occurred according to an interaction between the material and light, and hence light is scattered in all directions by oscillating charges;

$R_\theta$ is the excess Rayleigh ratio;

$K^* = 4\pi^2 n_0^2 (dn/dc)^2 \lambda_0^{-4} N_A^{-1}$, here $n_0$ is a refractive index of solvent, $N_A$ is Avogadro's number, and do/dc is a specific refractive index increment, that is differentiated from a change rate of refractive index changed according to a change rate of concentration of dilute solution and is determined within the range of 0.001 to 0.1 g/ml as a concentration change section, when a refractive index is detected by injecting a polyimide powder in a state of dilute solution in an organic solvent into a flow cell of differential refractometer;

c is a polymer concentration (g/ml) in a solution;

M is molar mass, and weight average molecular weight (Mw) in the case of polydisperse sample;

$A_2$ is the second virial coefficient; and $P(\theta) = R_\theta / R_0$]

Another embodiment of the present invention provides the polyimide film obtained by producing a film with imides of polyamic acid obtained from the polymerization of diamines and acid dianhydrides, in which the polyimide film has an absolute molecular weight (Mw) of 30,000 to 170,000, determined by the following Formula 1:

$$\frac{R_\theta}{K^* c} = MP(\theta) - 2A_2 c M^2 P^2(\theta) \quad \text{[Formula 1]}$$

[wherein, the above Formula 1 is induced from a principle determining molar mass and size of polymer from angular variation and amount of scattered light measured by an irradiation of laser light to a solution containing any polymer and solvent, using a principle that the amount of charge transfer and the amount of light emission are depended on a polarizability of material for the phenomenon, of which a polarizing is occurred according to an interaction between the material and light, and hence light is scattered in all directions by oscillating charges;

$R_\theta$ is the excess Rayleigh ratio;

$K^* = 4\pi^2 n_0^2 (dn/dc)^2 \lambda_0^{-4} N_A^{-1}$, here $n_0$ is a refractive index of solvent, $N_A$ is Avogadro's number, and do/dc is a specific refractive index increment, that is differentiated from a change rate of refractive index changed according to a change rate of concentration of dilute solution and is determined within the range of 0.001 to 0.1 g/ml as a concentration change section, when a refractive index is detected by injecting a polyimide film in a state of dilute solution in an organic solvent into a flow cell of differential refractometer;

c is a polymer concentration (g/ml) in a solution;

M is molar mass, and weight average molecular weight (Mw) in the case of polydisperse sample;

$A_2$ is the second virial coefficient; and $P(\theta) = R_\theta / R_0$]

The polyimide film according to an embodiment of the present invention may have the degree of imidization of at least 95%.

The polyimide film according to an embodiment of the present invention may have an absolute molecular weight (Mw) of 50,000 to 150,000.

For the polyimide film according to an embodiment of the present invention, its polydispersity index of absolute molecular weight may be 1.1 to 1.6, and preferably may be 1.1 to 1.3.

For the polyimide film according to an embodiment of the present invention, the acid dianhydrides may include 2,2-bis(3,4-dicarboxyphenyl)hexafluoropropane dianhydride. At this time, 2,2-bis(3,4-dicarboxyhenyl)hexafluoropropane dianhydride may be included in 30 mol % to 100 mol % in the acid anhydrides.

For the polyimide film according to an embodiment of the present invention, the diamines may include 2,2'-bis(trifluoromethyl)-4,4'-diaminophenyl. At this time, 2,2'-bis(trifluoromethyl)-4,4'-diaminophenyl may be included in 20 mol % to 100 mol % in the diamines.

The polyimide film according to an embodiment of the present invention may be obtained from imides of polyamic acid obtained by firstly injecting 2,2-bis(3,4-dicarboxyphenyl)hexafluoropropane dianhydride out of the acid anhydrides.

The polyimide film according to another embodiment of the present invention may be obtained from imides of polyamic acid obtained by finally injecting 2,2-bis(3,4-dicarboxyphenyl)hexafluoropropane dianhydride out of the acid anhydirdes.

For the polyimide film according to embodiments of the present invention, a polymerization may be performed for 1 hour to 24 hours.

Preferably, the polymerization may be performed for 8 hours to 12 hours.

The polyimide film according to an embodiment of the present invention may have a degree of yellowness of not more than 4.5 based on a film thickness of 50~100 μm.

Furthermore, the polyimide film according to an embodiment of the present invention may have a mean coefficient of linear thermal expansion (CTE) of not more than 70 ppm/° C., measured within the range of 50 to 250° C. using a mechanical thermal analysis based on a film thickness of 50~100 μm.

Furthermore, an embodiment of the present invention provides a method for producing the polyimide film, comprising:

obtaining a polyamic acid solution by polymerizing diamines and acid dianhydrides in an organic solvent;

producing a solution containing imides by an imidization to be the degree of imidization of at least 80% by injecting a chemical conversion agent to the polyamic acid solution;

precipitating by adding a solvent selected from methyl alcohol, ethyl alcohol, isopropyl alcohol, ethylene glycol, triethylene glycol, 2-butyl alcohol, 2-propyl alcohol, 2-hexyl alcohol, cyclopentyl alcohol, cyclohexyl alcohol, phenol, and t-butyl alcohol to the solution containing imides;

filtering solids precipitated from the above step;

obtaining a polyimide powder by drying a filtrate;

dissolving the polyimide powder in an organic solvent;

making a film with the polyimide solution; and heating the film at 100 to 500° C.;

in which the polyimide film has an absolute molecular weight (Mw) of 30,000 to 170,000, determined by the following Formula 1:

$$\frac{R_\theta}{K^* c} = MP(\theta) - 2A_2 c M^2 P^2(\theta) \quad \text{[Formula 1]}$$

[wherein, the above Formula 1 is induced from a principle determining molar mass and size of polymer from angular variation and amount of scattered light measured by an irradiation of laser light to a solution containing any polymer and solvent, using a principle that the amount of charge transfer and the amount of light emission are depended on a polarizability of material for the phenomenon, of which a polarizing is occurred according to an interaction between the material and light, and hence light is scattered in all directions by oscillating charges;

$R_\theta$ is the excess Rayleigh ratio;

$K^* = 4\pi^2 n_0^2 (dn/dc)^2 \lambda_0^{-4} N_A^{-1}$, here $n_0$ is a refractive index of solvent, $N_A$ is Avogadro's number, and do/dc is a specific refractive index increment, that is differentiated from a change rate of refractive index changed according to a change rate of concentration of dilute solution and is determined within the range of 0.001 to 0.1 g/ml as a concentration change section, when a refractive index is detected by injecting a polyimide film in a state of dilute solution in an organic solvent into a flow cell of differential refractometer;

c is a polymer concentration (g/ml) in a solution;

M is molar mass, and weight average molecular weight (Mw) in the case of polydisperse sample;

$A_2$ is the second virial coefficient; and $P(\theta) = R_\theta / R_0$]

For the method for producing the polyimide film according to an embodiment of the present invention, the chemical conversion agent may include a catalyst and a dehydrating agent.

The polyimide film according to an embodiment of the present invention has the excellent transparency and heat resistance, and hence the dimensions change according to thermal stress is small, so that it is expected to be useful in a transparent electrically conductive film, a TFT substrate, a flexible printed circuit substrate, and the like.

Technical Solution

Hereinafter, the present invention will be described in more detail as follows.

The polyimide powder according to an embodiment of the present invention may be imides of polyamic acid obtained by the polymerization of diamines and acid dianhydrides, in which the degree of imidization may be at least 80% and its absolute molecular weight (Mw) may be 40,000 to 150,000 in order to secure a transparency and also satisfy a heat resistance, in which the absolute molecular weight is determined by the following Formula 1:

$$\frac{R_\theta}{K^* c} = MP(\theta) - 2A_2 cM^2 P^2(\theta) \quad \text{[Formula 1]}$$

[wherein, the above Formula 1 is induced from a principle determining molar mass and size of polymer from angular variation and amount of scattered light measured by an irradiation of laser light to a solution containing any polymer and solvent, using a principle that the amount of charge transfer and the amount of light emission are depended on a polarizability of material for the phenomenon, of which a polarizing is occurred according to an interaction between the material and light, and hence light is scattered in all directions by oscillating charges;

$R_\theta$ is the excess Rayleigh ratio;

$K^* = 4\pi^2 n_0^2 (dn/dc)^2 \lambda_0^{-4} N_A^{-1}$, here $n_0$ is a refractive index of solvent, $N_A$ is Avogadro's number, and do/dc is a specific refractive index increment, that is differentiated from a change rate of refractive index changed according to a change rate of concentration of dilute solution and is determined within the range of 0.001 to 0.1 g/ml as a concentration change section, when a refractive index is detected by injecting a polyimide powder in a state of dilute solution in an organic solvent into a flow cell of differential refractometer;

c is a polymer concentration (g/ml) in a solution;

M is molar mass, and weight average molecular weight (Mw) in the case of polydisperse sample;

$A_2$ is the second virial coefficient; and $P(\theta) = R_\theta / R_0$]

For instance, a method for measuring an absolute molecular weight for measuring a molecular weight of polymer may include a method for measuring an absolute molecular weight using light scattering in a polymer solution.

The light scattering is occurred by a polymer chain in the polymer solution because a polymer coil size is smaller or similar to wavelength of light, or also the polymer chains is polarized by an electric field of incident light. A degree of scattering is out of proportion to the amount of material that causes scattering, and in the case of the same amount of scatterer, the scattering caused by large particles is very strong rather than that caused by small particles. Accordingly, the degree of light scattering is influenced by the particle size so that the information about the molecular weight of polymer can be obtained by using the degree of light scattering. Furthermore, when light pass through the dilute polymer solution, of which a refractive index of solvent is different from a refractive index of polymer dissolved in the above solvent, light may be scattered according to strength depended on the size and concentration of polymer dissolved in addition to the difference of refractive indexes of the polymer and solvent. If the polymer solution is sufficient dilute solution, the strength of scattered light may be expressed as the total levels of contributions for scattering occurred by each of the polymer coils that are well separated in the solution. That is because when the size of polymer coil dissolved is significantly small rather than wavelength of light, they may be isotropy, or when having the same polarizability in all directions, the strength of scattered light by each of the polymer coils in any direction is proportional to the square of wave vector size of scattered light.

The above Formula 1 is induced from the above principle, and examples of apparatus for obtaining an absolute molecular weight by the formula as mentioned above include Multi Angle Light Scattering (MALS) System produced from Wyatt Company. Many data in addition to a weight average molecular weight, a size, a molecular weight distribution, and the like of samples to be analyzed can be obtained from MALS as mentioned above.

However, it is generally difficult to measure an absolute molecular weight according to light scattering in the case of the polyimide powder or polyimide film because a solubilization of polymer is difficult due to a large quantity of aromatic rings. When a large quantity of aromatic rings is presented, it becomes to be colored.

In this way, in the case of the polyimide powder having an absolute molecular weight (Mw) of 40,000 to 150,000 obtained by MALS supplied from an embodiment of the present invention, the transparency and also heat resistance are excellent.

If the absolute molecular weight (Mw) obtained by MALS is not more than 40,000, a filming may not be occurred due to a lack of viscosity, or an optical property, a mechanical property, and heat resistance may be reduced; and if it is more than 150,000, a thickness of film is difficult to control due to an excessive viscosity, or physical properties may be different according to film or part of film, and a flexibility and a productivity may be reduced on producing a film. Preferably, the absolute molecular weight of 50,000 to 150,000 may be preferable from the transparency and heat resistance viewpoints.

Furthermore, when the degree of imidization of the polyimide powder of the present invention is at least 80%, it is preferable from a storage stability viewpoint. When the degree of imidization of the polyimide powder is not more than 80%, there may be a problem with the storage stability.

Furthermore, the polydispersity index of absolute molecular weight of the polyimide powder according to an embodiment of the present invention, in which the polydispersity index of absolute molecular weight is determined by Formula 1, may be 1.1 to 1.5. Preferably, the polydispersity index of absolute molecular weight may be within the above range because it affects the optical property, the mechanical property, and the heat resistance. Most preferably, the polydispersity index of absolute molecular weight may be 1.1 to 1.3.

Example for obtaining the polyimide powder that can be contented with the degree of imidization and absolute molecular weight as mentioned above may include a method for controlling a selection of monomer, an order of polymerization, a method for polymerizing, and the like, and also a method for changing a precipitating method for obtaining the powder.

For example, the polyimide powder according to an embodiment of the present invention may be obtained by the imidization of the polyamic acid obtained from the polymerization of the acid dianhydrides and diamines. Considering the transparency, preferably the acid dianhydrides may include 2,2-bis(3,4-dicarboxyphenyl)hexafluoropropane dianhydride (6-FDA). And, it may further include more than one selected from the group consisting of 4-(2,5-dioxotetrahydrofurane-3-yl)-1,2,3,4-tetrahydronaphthalene-1,2-dicarboxylic anhydride (TDA), and 4,4'-(4,4'-isopropylidenediphenoxy)bis(phthalicanhydride) (HBDA). Considering the heat resistance, more preferably more than one selected from pyromellitic dianhydride (PMDA), biphenyltetracarboxylic dianhydride (BPDA), and oxyphthalic dianhydride (ODPA) may be used together.

The used amount of 6-FDA out of the acid dianhydrides may be preferably 30 mol % to 100 mol %.

Preferably, the amount of 6-FDA used of the acid dianhydrides may be 30 to 100 mol % for expressing the transparency and hindering other physical properties, such as the heat resistance.

Meanwhile, example of the diamines may include more than one selected from 2,2-bis[4-(4-aminophenoxy)-phenyl] propane (6HMDA), 2,2'-bis(trifluoromethyl)-4,4'-diaminobiphenyl (2,2'-TFDB), 3,3'-bis(trifluoromethyl)-4,4'-diaminobiphenyl (3,3'-TFDB), 4,4'-bis(3-aminophenoxy)diphenylsulfone (DBSDA), bis(3-aminophenyl)sulfone (3DDS), bis(4-aminophenyl)sulfone (4DDS), 1,3-bis(3-aminophenoxy)benzene (APB-133), 1,4-bis(4-aminophenoxy)benzene (APB-134), 2,2'-bis[3(3-aminophenoxy)phenyl]hexafluoropropane (3-BDAF), 2,2'-bis[4(4-aminophenoxy)phenyl]hexafluoropropane (4-BDAF), 2,2'-bis(3-aminophenyl)hexafluoropropane (3,3'-6F), 2,2'-bis(4-aminophenyl)hexafluoropropane (4,4'-6F), and oxydianiline (ODA), and preferably may include 2,2'-TFDB of the whole diamines for properly securing a free volume by a side chain.

More preferably, 2,2'-TFDB of the whole diamines may be included in 20 to 100 mol % for maintaining the transparency through securing the free volume by the side chain.

The equimolar concentration of the acid dianhydride components and diamine components as mentioned above are dissolved in a solvent to react and then the polyamic acid solution is produced.

For the reaction conditions, it is not limited, but the reaction temperature is preferably −20~80° C., and the polymerization time is 1 hour to 24 hours, but preferably 8 hours to 12 hours. Furthermore, more preferably, the reaction is performed under an inert atmosphere, such as argon, nitrogen, and the like.

Example of the solvent for the solution polymerization of the monomers as mentioned above (hereinafter, referred to as "first solvent") is not limited especially as long as it can dissolve the polyamic acid. More than one polar solvent selected from m-cresol, N-methyl-2-pyrrolidone (NMP), dimethylformamide (DMF), dimethylacetamide (DMAc), dimethylsulfoxide (DMSO), acetone, and diethylacetate is used as the known reaction solvent. A low boiling point solution, such as tetrahydrofuran (THF) and chloroform, and a low absorbency solvent, such as γ-butyrolactone can be used above this.

The content of the first solvent is not limited especially, but preferably 50~95 wt % in the whole polyamic acid solution, and more preferably 70-90 wt % in order to obtain the proper molecular weight and viscosity of the polyamic acid solution.

A method for producing the polyimide powder using the monomer as mentioned above is not limited especially, and for example the polyimide resin solids can be obtained by the method comprising: obtaining the polyamic acid solution by polymerizing diamines and acid dianhydrides under the first solvent; producing the solution containing imides by the imidization of the polyamic acid solution obtained; precipitating by adding the second solvent to the solution containing the imides; and filtering and drying the solids precipitated.

At this time, a polarity of the second solvent may be lower than that of the first solvent, and the second solvent is for precipitating the resin solids.

Example of the second solvent may include water, methyl alcohol, ethyl alcohol, isopropyl alcohol, ethylene glycol, triethylene glycol, 2-butyl alcohol, 2-propyl alcohol, 2-hexyl alcohol, cyclopentyl alcohol, cyclohexyl alcohol, phenol, t-butyl alcohol, and the like.

Meanwhile, the heat resistance of the polyimide can be ultimately controlled by controlling the injection order of monomers, and for example preferably, the molecular weight may be increased and also the polyimide powder having greater absolute molecular weight may be obtained under the same time period of the polymerization by injecting 6-FDA out of acid dianhydrides at the end, not by injecting it in advance. As a result, the heat resistance can be controlled by controlling the injection order of monomers so that the heat resistance can be improved in the case of the polyimide powder having high absolute molecular weight.

In addition, the heat resistance of the film can be controlled according to the polymerization time, that is, the longer the polymerization time, the larger the absolute molecular weight. However, when a fixed polymerization time has passed, the value of the absolute molecular weight would again get smaller so that it can be expected that the polymerization time becomes excessively longer, and hence the absolute molecular weight is decreased due to a depolymerization.

Therefore, if the polymerization time becomes excessively longer, the thermal stability (CTE) may be deteriorated due to the decrease of the molecular weight, while if it becomes excessively shorter; the distribution of the molecular weight (PDI) becomes excessively broader thereby reducing the mechanical physical properties of the film. Accordingly, preferably, the polymerization time may be 1 hour to 24 hours, and most preferably 8 hours to 12 hours in order to giving the proper absolute molecular weight value and distribution of the absolute molecular weight so that the polyimide powder can be obtained to evenly satisfy the heat resistance and transparency.

When imidizing by injecting the chemical conversion agent to the polyamic acid solution, the degree of imidization may be at least 80%, and preferably at least 85% for the optical properties, mechanical properties, and heat resistance.

For the conditions of drying the polyimide resin solids obtained after filtering, preferably the temperature may be 50~120° C. and the time may be 3 hours to 24 hours considering the boiling point of the second solvent.

Meanwhile, according to an embodiment of the present invention, the imides of the polyamic acid obtained by polymerizing diamines and acid dianhydrides may be obtained by making a film, and the polyimide film having the absolute molecular weight of 30,000 to 170,000 can be provided, in which the absolute molecular weight is determined by the following Formula 1:

$$\frac{R_\theta}{K^*c} = MP(\theta) - 2A_2cM^2P^2(\theta) \qquad \text{[Formula 1]}$$

[wherein, the above Formula 1 is induced from a principle determining molar mass and size of polymer from angular variation and amount of scattered light measured by an irradiation of laser light to a solution containing any polymer and solvent, using a principle that the amount of charge transfer and the amount of light emission are depended on a polarizability of material for the phenomenon, of which a polarizing is occurred according to an interaction between the material and light, and hence light is scattered in all directions by oscillating charges;

$R_\theta$ is the excess Rayleigh ratio;

$K^*=4\pi^2 n_0^2 (dn/dc)^2 \lambda_0^{-4} N_A^{-1}$, here $n_0$ is a refractive index of solvent, $N_A$ is Avogadro's number, and do/dc is a specific refractive index increment, that is differentiated from a change rate of refractive index changed according to a change rate of concentration of dilute solution and is determined within the range of 0.001 to 0.1 g/ml as a concentration change section, when a refractive index is detected by injecting a polyimide film in a state of dilute solution in an organic solvent into a flow cell of differential refractometer;

c is a polymer concentration (g/ml) in a solution;

M is molar mass, and weight average molecular weight (Mw) in the case of polydisperse sample;

$A_2$ is the second virial coefficient; and $P(\theta)=R_\theta/R_0$]

As mentioned above, it is generally difficult to measure the absolute molecular weight according to light scattering in the case of the polyimide film because a solubilization of polymer is difficult due to a large quantity of aromatic rings. When a large quantity of aromatic rings is presented, it becomes to be colored.

In this way, in the case of the polyimide film having the absolute molecular weight (Mw) of 30,000 to 170,000 obtained by MALS supplied from an embodiment of the present invention, the transparency and also heat resistance are excellent.

If the absolute molecular weight (Mw) of the polyimide film obtained by MALS, in which Mw is obtained by MALS, is not more than 30,000, the optical property, the mechanical property, and the heat resistance may be reduced; and if it is more than 170,000, the flexibility and the productivity of the film may be reduced. Preferably, the absolute molecular weight of 30,000 to 170,000 may be preferable from the transparency and heat resistance viewpoints.

Furthermore, the degree of imidization of the polyimide film of the present invention is preferably at least 95% from the optical property, mechanical property, and the heat resistance viewpoints.

When the degree of imidization of the polyimide film is not more than 95%, there may be a problem with the optical and mechanical physical property, and the heat resistance.

Furthermore, the polydispersity index of absolute molecular weight of the polyimide film according to an embodiment of the present invention, in which the polydispersity index is determined by Formula 1, may be 1.1 to 1.6. Preferably, the polydispersity index of absolute molecular weight may be within the above range because it affects the optical physical property, the mechanical physical property, and the heat resistance. Most preferably, the polydispersity index of absolute molecular weight may be 1.1 to 1.3.

Example for obtaining the polyimide film that can be contented with the degree of imidization and absolute molecular weight as mentioned above may include a method for controlling a selection of monomer, an order of polymerization, a method for polymerizing, and the like, or also a method for selecting a precipitating method for obtaining the powder, as mentioned in the paragraphs of the polyimide powder. The detailed description related to the above methods will be omitted in here.

The method for producing the polyimide film may include steps for dissolving the polyimide powder obtained as mentioned above in an organic solvent to obtain the polyimide solution, and then making and heating the film.

At this time, the first solvent can be used as the organic solvent.

The polyimide solution is casted on a support and then is heated for 1 minute to 8 hours while it is slowly increased within the range of 40~400° C. to obtain the polyimide film. It may be further heated once again in order to increase the thermal stability and reduce a thermal history. The temperature for further heating may preferably be 100~500° C. and the time for heating may preferably 1 minute to 30 minutes.

A residual volatile component in the film after heating may be not more than 5%, and preferably not more than 3%.

At this time, the chemical conversion agent may include the dehydrating agent represented as acid anhydride, such as acetic acid anhydride, and the like, and the catalyst for imidizing represented as tertiary amines, such as isoquinoline, β-picoline, pyridine, and the like. It may be preferable to combine the chemical imidization for reducing the decrease of the molecular weight.

Furthermore, preferably, the polyimide film according to an embodiment of the present invention may have the degree of yellowness of not more than 4.5 for securing the transparency.

In addition, the average transmittance at 400 to 740 nm measured by using UV spectrophotometer based on the film thickness of 50~100 μm may be preferably at least 85%. If the average transmittance at 400 to 740 nm measured by using UV spectrophotometer based on the film thickness of 50~100 μm is not more than 85%, there may be a problem that a proper visual effect could not be shown for using as the application of display.

Furthermore, unlike the general colored polyimide film, the polyimide film according to an embodiment of the present invention may preferably have L value of at least 90, a value of not more than 5, and b value of not more than 5 when measuring a chromaticity coordinates by using UV spectrophotometer based on the film thickness of 50~100 μm.

In addition, considering the effect to the dimension change, the polyimide film may preferably have the mean coefficient of linear thermal expansion (CTE) of not more than 70 ppm/° C., measured within the range of 50 to 250° C. using the mechanical thermal analysis based on a film thickness of 50~100 μm. When the mean coefficient of linear thermal expansion is more than the above value, this causes the dimension change because the mean coefficient of linear thermal expansion becomes excessively larger on producing an adhesive film and the difference of coefficient of linear thermal expansion with that of metal film becomes great.

Preferably, the mean coefficient of linear thermal expansion (CTE) may be 15 ppm/° C. to 60 ppm/° C.

BEST MODE

Hereinafter, the embodiments of the present invention will be described in detail as follows, but the present invention will not be limited thereto.

Example 1

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 71.08 g (0.16 mol) of 6FDA was added and stirred for 1 hour to completely dissolve 6FDA. At this time, the temperature of the solution was maintained at 25° C. And, 11.76 g (0.04 mol) of BPDA was added and then the solution of the polyamic acid having the solid concentration of 20 wt % was obtained.

The solution of the polyamic acid was stirred at a room temperature for 12 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 120 g of the solid powder (the degree of imidization was 82%).

Example 2

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 11.76 g (0.04 mol) of BPDA was added and stirred for 1 hour to completely dissolve BPDA. At this time, the temperature of the solution was maintained at 25° C. And, 71.08 g (0.16 mol) of 6FDA was added and then the solution of the polyamic acid having the solid concentration of 20 wt % was obtained.

The solution of the polyamic acid was stirred at a room temperature for 3 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 90 g of the solid powder (the degree of imidization was 80%).

Example 3

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 11.76 g (0.04 mol) of BPDA was added and stirred for 1 hour to completely dissolve BPDA. At this time, the temperature of the solution was maintained at 25° C. And, 71.08 g (0.16 mol) of 6FDA was added and then the solution of the polyamic acid having the solid concentration of 20 wt % was obtained.

The solution of the polyamic acid was stirred at a room temperature for 12 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 126 g of the solid powder (the degree of imidization was 82%).

Example 4

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 11.76 g (0.04 mol) of BPDA was added and stirred for 1 hour to completely dissolve BPDA. At this time, the temperature of the solution was maintained at 25° C. And, 71.08 g (0.16 mol) of 6FDA was added and then the solution of the polyamic acid having the solid concentration of 20 wt % was obtained.

The solution of the polyamic acid was stirred at a room temperature for 24 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 125 g of the solid powder (the degree of imidization was 83%).

The data about the polymer was collected using the following method about the polyimide powders that were obtained from the above Example 1 to Example 4.

(1) Apparatus and Method for Analyzing

GPC & MALS Analysis Apparatus: GPC—Water 1525 Binary HPLC pump; RI detector—Wyatt optilab rEX; MALS—Wyatt Dawn 8+; Column—μ—Styragel HT Linear (7.8*300 mm) 2EA, Styragel HT 6E (2) Pretreatment Method of Sample 0.05 g of the powders that were obtained from the above Example 1 to Example 4 were weighted and dissolved in 10 ml of DMF (containing 0.05% LiCl). The solutions of DMF containing the powder were added to an oven of 50° C. and dissolved for 2 hours while shaking. After completely dissolving the sample, it was filtered with 0.45 μm syringe filter and then installed to MALS autosampler.

(3) Analysis Method
Injection volume: 400 μl
Injection Temp.: 50° C.
Flow Rate: 1 ml/min
Eluent: DMF (containing 0.05% LiCl): Refractive index 1.405
Column Temp.: 50° C.
Dn/Dc: see the following description At this time, Dn/Dc relates to the specific refractive index increment, and is the value that a change rate of refractive index according to the change rate of dilute solution concentration is differentiated and is measured within the range of 0.001 to 0.1 g/ml that is a section of concentration change when detecting a refractive index through injecting the polyimide powder in a state of dilute solution in an organic solvent inside flow cell of differential refractometer. Specifically, the above value was measured as the following method.

(4) Analysis Apparatus that is used for Measuring Dn/Dc
RI Detector: Wyatt Optilavb rEX
(5) Pretreatment Method of Sample for Measuring Dn/Dc Firstly, 0.2 g of the polyimide powders that were obtained from the above Example 1 to Example 4 were dissolved in 50 10, of DMF (containing 0.05% LiCl) to prepare a sample of high concentration. At this time, because it was not easily dissolved, it was added to an oven of 50° C., and dissolved for about 2 hours while shaking. The samples having 0.0032 g/ml, 0.0024 g/ml, 0.0016 g/ml and 0.0008 g/ml concentration, respectively were prepared by diluting the sample having a high concentration. For each sample, the refractive index values according to the concentration were measured using 0.45 μm syringe filter.

(6) Analysis Method of Dn/Dc Sample
injection volumn: 10 ml
injector Temp.: 50° C.
flow rate: 16 ml/hr
eluent: DMF (containing 0.05% LiCl)

As the results obtained from the above analysis, in the case of the polyimide powders that were obtained from the above Example 1 to Example 4, Dn/Dc value was 0.1180 at 50° C. of DMF (containing 0.05% LiCl).

The absolute molecular weight value according to MALS can be calculated according to the above method from Dn/Dc value that was obtained. The results were shown in the following Table 1.

TABLE 1

|  | Dn/Dc | Mn (g/mol) | Mp (g/mol) | Mw (g/mol) | Mz (g/mol) | Rz (nm) | Polydispesity |
|---|---|---|---|---|---|---|---|
| Example 1 | 0.1180 | $5.004 \times 10^4$ | $7.513 \times 10^4$ | $5.655 \times 10^4$ | $6.132 \times 10^4$ | 9.9 | 1.130 |
| Example 2 | 0.1180 | $3.407 \times 10^4$ | $4.446 \times 10^4$ | $4.241 \times 10^4$ | $5.511 \times 10^4$ | 14.6 | 1.245 |
| Example 3 | 0.1180 | $1.138 \times 10^5$ | $1.438 \times 10^5$ | $1.385 \times 10^5$ | $1.810 \times 10^5$ | 24.0 | 1.217 |
| Example 4 | 0.1180 | $7.564 \times 10^4$ | $1.120 \times 10^5$ | $8.727 \times 10^4$ | $9.496 \times 10^4$ | 14.8 | 1.153 |

Example 5

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 71.08 g (0.16 mol) of 6FDA was added and stirred for 1 hour to completely dissolve 6FDA. At this time, the temperature of the solution was maintained at 25° C. And, 11.76 g (0.04 mol) of BPDA was added and then the solution of the polyamic acid having the solid concentration of 20 wt % was obtained.

The solution of the polyamic acid was stirred at a room temperature for 3 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 120 g of the solid powder (the degree of imidization was 80%).

The solid powder obtained from the above method was dissolved in 480 g of N,N-dimethylacetamide (DMAc) to obtain 20 wt % of the solution (viscosity: 70 poise).

After finishing the reaction, the obtained solution was applied to a stainless board and then cast in 700 μm; after drying for 1 hour with a hot-air of 150° C., the film was detached from the stainless board and then fixed in a frame with a pin.

After the frame fixed with the film was added to the vacuum oven and slowly heated for 2 hours from 100° C. to 300° C., it was slowly cooled to remove from the frame to obtain the polyimide film. And then, it was again heated for 30 minutes at 300° C. to obtain the polyimide film as the final heating (thickness: 100 μm, and the degree of imidization: 95%).

Example 6 to Example 8

The polyimide film was obtained using the same method to the above Example 5, but the reaction time was changed to 5, 12 and 24 hours, respectively when preparing the solution of the polyamic acid.

Example 9

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 11.76 g (0.04 mol) of BPDA was added and stirred for 1 hour to completely dissolve BPDA. At this time, the temperature of the solution was maintained at 25° C. And, 71.08 g (0.16 mol) of 6FDA was added and then the solution of the polyamic acid having the solid concentration of 20 wt % was obtained.

The solution of the polyamic acid was stirred at a room temperature for 3 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 90 g of the solid powder (the degree of imidization was 80%).

The solid powder obtained from the above method was dissolved in 360 g of N,N-dimethylacetamide (DMAc) to obtain 20 wt % of the solution (viscosity: 70 poise).

After finishing the reaction, the obtained solution was applied to a stainless board and then cast in 700 μm; after drying for 1 hour with a hot-air of 150° C., the film was detached from the stainless board and then fixed in a frame with a pin.

After the frame fixed with the film was added to the vacuum oven and slowly heated for 2 hours from 100° C. to 300° C., it was slowly cooled to remove from the frame to obtain the polyimide film. And then, it was again heated for 30 minutes at 300° C. to obtain the polyimide film as the final heating (thickness: 100 μm, and the degree of imidization: 95%).

Example 10 and Example 11

The polyimide film was obtained using the same method to the above Example 9, but the reaction time was changed to 12 and 24 hours, respectively when preparing the solution of the polyamic acid.

Example 12

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 11.76 g (0.04 mol) of BPDA was added and stirred for 1 hour to completely dissolve BPDA. At this time, the temperature of the solution was maintained at 25° C. And, 71.08 g (0.16 mol) of 6FDA was added and then the solution of the polyamic acid having the solid concentration of 20 wt % was obtained.

The solution of the polyamic acid was stirred at a room temperature for 12 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of water to precipitate; the precipitated solid was filtered and grinded; and then dried at 80° C. in vacuum for 6 hours to obtain 123 g of the solid powder (the degree of imidization was 81%).

The solid powder obtained from the above method was dissolved in 492 g of N,N-dimethylacetamide (DMAc) to obtain 20 wt % of the solution (viscosity: 70 poise).

After finishing the reaction, the obtained solution was applied to a stainless board and then cast in 700 μm; after drying for 1 hour with a hot-air of 150° C., the film was detached from the stainless board and then fixed in a frame with a pin.

After the frame fixed with the film was added to the vacuum oven and slowly heated for 2 hours from 100° C. to 300° C., it was slowly cooled to remove from the frame to obtain the polyimide film. And then, it was again heated for 30 minutes at 300° C. to obtain the polyimide film as the final heating (thickness: 100 μm, and the degree of imidization: 95%).

The data about the polymer was collected using the following method about the polyimide films that were obtained from the above Example 5 to Example 12.

(1) Apparatus and Method for Analyzing
GPC & MALS Analysis Apparatus: GPC—Water 1525 Binary HPLC pump; RI detector—Wyatt optilab rEX; MALS—Wyatt Dawn 8+; Column—μ—Styragel HT Linear (7.8*300 mm) 2EA, Styragel HT 6E (2) Pretreatment Method of Sample
0.05 g of the films that were obtained from the above Example 5 to Example 12 was weighted and 10 ml of DMF (containing 0.05% LiCl) was added in the vial. The solutions of DMF containing the films were added to an oven of 50° C. and dissolved for 2 hours while shaking. After completely dissolving the sample, it was filtered with 0.45 μm syringe filter and then installed to MALS autosampler.

(3) Analysis Method
Injection volume: 400 μl
Injection Temp.: 50° C.
Flow Rate: 1 ml/min
Eluent: DMF (containing 0.05% LiCl, Refractive index 1.405)
Column Temp.: 50° C.
Dn/Dc: see the following description At this time, Dn/Dc relates to the specific refractive index increment, and is the value that a change rate of refractive index according to the change rate of dilute solution concentration is differentiated and is measured within the range of 0.001 to 0.1 g/ml that is a section of concentration change when detecting a refractive index through injecting the polyimide film in a state of dilute solution in an organic solvent inside flow cell of differential refractometer. Specifically, the above value was measured as the following method.

(4) Analysis Apparatus that is used for Measuring Dn/Dc
RI Detector: Wyatt Optilavb rEX (5) Pretreatment Method of Sample for Measuring Dn/Dc
Firstly, 0.2 g of the polyimide films that were obtained from the above Example 5 to Example 12 were dissolved in 50 ml of DMF (containing 0.05% LiCl) to prepare a sample. At this time, because it was not easily dissolved, it was added to an oven of 50° C., and dissolved for about 2 hours while shaking. The samples having 0.0032 g/ml, 0.0024 g/ml, 0.0016 g/ml and 0.0008 g/ml concentration, respectively were prepared by diluting the sample having a high concentration. The refractive index values according to the concentration were measured using 0.45 gill syringe filter.

(6) Analysis Method of Dn/Dc Sample
injection volumn: 10 ml
injector Temp.: 50° C.
flow rate: 16 ml/hr
eluent: DMF (Refractive index 1.405)

As the results obtained from the above analysis, in the case of the polyimide films that were obtained from the above Example 5 to Example 12, Dn/Dc value was 0.1216 at 50° C. of DMF.

The absolute molecular weight value according to MALS can be calculated according to the above method from Dn/Dc value that was obtained. The results were shown in the following Table 2.

Above this, the transmittance, a color coordinate, a degree of yellowness and the coefficient of linear thermal expansion were measured using the following methods, and then the results were shown in the following Table 3.

(7) Transmittance and Color Coordinate The visible ray transmittances of the prepared films were measured using UV spectrophotometer (available from Varian Company, Cary100).

In addition, the color coordinates of the prepared films were measured according to ASTM E 1347-06 standard using UV spectrophotometer (available from Varian Company, Cary100), and an illuminant was based on the measurement value according to CIE D65.

(8) Degree of Yellowness
The degree of yellowness was measured in ASTM E313 standard.

(9) Coefficient of Linear Thermal Expansion (CTE)
The mean coefficient of linear thermal expansion was measured at 50-250° C. according to TMA-Method using TMA (available from TA Instrument company, Q400).

TABLE 2

|  | Dn/Dc | Mn (g/mol) | Mp (g/mol) | Mw (g/mol) | Mz (g/mol) | Rz (nm) | Polydispesity |
|---|---|---|---|---|---|---|---|
| Example 5 | 0.1216 | $1.454 \times 10^4$ | $1.606 \times 10^4$ | $1.734 \times 10^4$ | $2.052 \times 10^4$ | 1.6 | 1.192 |
| Example 6 | 0.1216 | $2.610 \times 10^4$ | $3.096 \times 10^4$ | $3.128 \times 10^4$ | $4.039 \times 10^4$ | 17.2 | 1.198 |
| Example 7 | 0.1216 | $4.995 \times 10^4$ | $6.967 \times 10^4$ | $6.190 \times 10^4$ | $7.972 \times 10^4$ | 17.3 | 1.213 |
| Example 8 | 0.1216 | $3.711 \times 10^4$ | $4.871 \times 10^4$ | $4.642 \times 10^4$ | $4.642 \times 10^4$ | 21.9 | 1.251 |
| Example 9 | 0.1216 | $3.730 \times 10^4$ | $4.510 \times 10^4$ | $4.552 \times 10^4$ | $5.890 \times 10^4$ | 20.1 | 1.220 |
| Example 10 | 0.1216 | $1.071 \times 10^5$ | $1.334 \times 10^5$ | $1.278 \times 10^5$ | $1.625 \times 10^5$ | 23.6 | 1.193 |
| Example 11 | 0.1216 | $7.743 \times 10^4$ | $1.004 \times 10^5$ | $9.234 \times 10^4$ | $1.396 \times 10^5$ | 20.1 | 1.193 |
| Example 12 | 0.1216 | $3.868 \times 10^4$ | $7.050 \times 10^4$ | $5.877 \times 10^4$ | $8.011 \times 10^4$ | 3.3 | 1.520 |

TABLE 3

|  |  | Thickness (μm) | CTE* (ppm/°C.) | Y** | Transmittance (%) | | | | | Color Coordinate | | |
|---|---|---|---|---|---|---|---|---|---|---|---|---|
|  |  |  |  |  | 400 nm~740 nm | 550 nm~740 nm | 550 nm | 500 nm | 4200 nm | L | a | b |
| Ex. | 5 | 100 | — | 5.12 | 85.3 | 87.5 | 88.6 | 87.9 | 77.1 | 96.11 | −0.95 | 3.03 |
|  | 6 | 100 | 53.6 | 3.97 | 87.8 | 90.9 | 90.4 | 89.6 | 80.0 | 96.08 | −0.87 | 2.98 |
|  | 7 | 100 | 48.8 | 2.94 | 87.9 | 90.5 | 90.0 | 89.3 | 82.1 | 95.92 | −0.59 | 2.25 |
|  | 8 | 100 | 44.2 | 2.78 | 87.9 | 90.4 | 89.9 | 89.3 | 82.5 | 95.9 | −0.58 | 2.13 |
|  | 9 | 100 | 52.2 | 4.39 | 87.7 | 90.8 | 90.3 | 89.3 | 79.5 | 96.0 | −0.90 | 3.23 |
|  | 10 | 100 | 47.9 | 2.96 | 88.0 | 90.7 | 90.3 | 89.5 | 82.1 | 96.0 | −0.62 | 2.28 |
|  | 11 | 100 | 51.2 | 2.85 | 88.0 | 90.6 | 90.2 | 89.5 | 82.2 | 96.0 | −0.61 | 2.2 |
|  | 12 | 100 | 54.3 | 3.55 | 87.7 | 90.3 | 90.1 | 89.5 | 80.6 | 96.0 | −0.88 | 2.3 |

From the results of the above Table 3, the polyimide film according to the present invention has an excellent transparency and also an excellent dimensional stability about a thermal stress. However, it could be known that the film having an excessively small absolute molecular weight like Example 5 has a high degree of yellowness.

Example 13

While a nitrogen was passing through 1 L reactor comprising a stirrer, a nitrogen injector, a dropping funnel, a thermostat and a cooler as a reactor, 605.6 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 2.9422 g (0.01 mol) of BPDA was added and stirred for 1 hour to completely dissolve BPDA. At this time, the temperature of the solution was maintained at 25° C. And, 84.41 g (0.19 mol) of 6FDA was added and then the solution of the polyamic acid having the solid concentration of 20 wt % was obtained.

The solution of the polyamic acid was stirred at a room temperature for 12 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 147 g of the solid powder (the degree of imidization was 80.5%).

The solid powder obtained from the above method was dissolved in 588 g of N,N-dimethylacetamide (DMAc) to obtain 20 wt % of the solution (viscosity: 70 poise).

After finishing the reaction, the obtained solution was applied to a stainless board and then cast in 700 μm; after drying for 1 hour with a hot-air of 150 □, the film was detached from the stainless board and then fixed in a frame with a pin.

After the frame fixed with the film was added to the vacuum oven and slowly heated for 2 hours from 100° C. to 300° C., it was slowly cooled to remove from the frame to obtain the polyimide film. And then, it was again heated for 30 minutes at 300° C. to obtain the polyimide film as the final heating (thickness: 100 and the degree of imidization: 99.8%).

The data about the polymer was collected using the following method about the polyimide films.

(1) Apparatus and Method for Analyzing

GPC & MALS Analysis Apparatus: GPC—Water 1525 Binary HPLC pump; RI detector—Wyatt optilab rEX; MALS—Wyatt Dawn 8+; Column—use by connecting with Shodex K-803, K-804 and K-805

(2) Pretreatment Method of Sample 0.05 g of the films that were obtained were weighted and added in 10 ml vial of DMF (containing 0.05% LiCl). The solutions of DMF containing the films were added to an oven of 50° C. and dissolved for 2 hours while shaking. After completely dissolving the sample, it was filtered with 0.45 μm syringe filter and then installed to MALS autosampler.

(3) Analysis Method

Injection volume: 400 μl

Injection Temp.: 50° C.

Flow Rate: 1 ml/min

Eluent: DMF (containing 0.05% LiCl, Refractive index 1.390)

Column Temp.: 50° C.

Dn/Dc: see the following description

At this time, Dn/Dc relates to the specific refractive index increment, and is the value that a change rate of refractive index according to the change rate of dilute solution concentration is differentiated and is measured within the range of 0.001 to 0.1 g/ml that is a section of concentration change when detecting a refractive index through injecting the polyimide film in a state of dilute solution in an organic solvent inside flow cell of differential refractometer. Specifically, the above value was measured as the following method.

(4) Analysis Apparatus that is used for Measuring Dn/Dc
RI Detector: Wyatt Optilavb rEX (5) Pretreatment Method of Sample for Measuring Dn/Dc Firstly, 0.2 g of the polyimide films that were obtained were dissolved in 50 ml of DMF (containing 0.05% LiCl) to prepare a sample having a high concentration. At this time, because it was not easily dissolved, it was added to an oven of 50° C., and dissolved for about 2 hours while shaking. The samples having 0.0032 g/ml, 0.0024 g/ml, 0016 g/ml and 0.0008 g/ml concentration, respectively were prepared by diluting the sample having a high concentration. The refractive index values according to the concentration were measured using 0.45 μm an syringe filter.

(6) Analysis Method of Dn/Dc Sample injection volumn: 10 ml injector Temp.: 50° C.

flow rate: 16 ml/hr eluent: DMF (containing 0.05% LiCl, Refractive index 1.390)

As the results obtained from the above analysis, in the case of the polyimide films that were obtained, Dn/Dc value was 0.1348±0.0010 at 50° C. of DMF (containing 0.05% LiCl).

The absolute molecular weight value according to MALS can be calculated according to the above method from Dn/Dc value that was obtained. The results were shown in the following Table 4.

Example 14 to Example 17

The film was prepared using the same method to the above Example 13, but the mole % of BPDA to TFDB was changed when preparing the solution of the polyamic acid as the following Table 4.

The absolute molecular weight value according to MALS and Dn/Dc value about the obtained films can be calculated using the same method to Example 13 according to the above method from Dn/Dc value that was obtained. The results were shown in the following Table 4.

Example 18

The film was prepared using the same method to the above Example 13, but the polyamic acid solution was only produced by performing a thermal curing through using an azeotropic dehydrating agent, such as toluene, not performing a chemical curing through using pyridine and acetic anhydride.

The absolute molecular weight value according to MALS and Dn/Dc value about the obtained films can be calculated using the same method to Example 13 according to the above method from Dn/Dc value that was obtained. The results were shown in the following Table 4.

For the films obtained from the above Example 13 to 16, the degree of yellowness was measured based on ASTM E313 standard and then the results were shown in the following Table 5.

TABLE 5

|  | Degree of Yellowness | Mean Transmittance |
|---|---|---|
| Example 13 | 2.05 | 90.10 |
| Example 14 | 1.6522 | 90.08 |
| Example 15 | 3.63 | 90.08 |
| Example 16 | 3.07 | 90.06 |
| Example 17 | 3.40 | 89.50 |
| Example 18 | 3.66 | 89.00 |

Example 19

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 71.08 g (0.16 mol) of 6FDA was added and stirred for 1 hour to completely dissolve 6FDA. At this time, the temperature of the solution was maintained at 25° C. And, 11.76 g (0.04 mol) of BPDA was added and then the solution of the polyamic acid having the solid concentration of 20 wt % was obtained.

The solution of the polyamic acid was stirred at a room temperature for 3 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 120 g of the solid powder (the degree of imidization was 81%).

The solid powder obtained from the above method was dissolved in 480 g of N,N-dimethylacetamide (DMAc) to obtain 20 wt % of the solution (viscosity: 70 poise).

After finishing the reaction, the obtained solution was applied to a stainless board and then cast in 700 μm; after drying for 1 hour with a hot-air of 150° C., the film was detached from the stainless board and then fixed in a frame with a pin.

After the frame fixed with the film was added to the vacuum oven and slowly heated for 2 hours from 100° C. to 300° C., it was slowly cooled to remove from the frame to obtain the polyimide film. And then, it was again heated for 30 minutes at 300° C. to obtain the polyimide film as the final heating (thickness: 100 μm, and the degree of imidization: 99%).

TABLE 4

|  | TFDB to BPDA mol % | Dn/Dc | Mn (g/mol) | Mp (g/mol) | Mw (g/mol) | Mz (g/mol) | Rz (nm) | Polydispesity |
|---|---|---|---|---|---|---|---|---|
| Ex. 13 | 5 | 0.1348 ± 0.0010 | $5.616 \times 10^5$ | $7.643 \times 10^4$ | $7.557 \times 10^4$ | $1.055 \times 10^6$ | 10.5 | 1.346 |
| Ex. 14 | 10 | 0.1158 ± 0.0006 | $5.394 \times 10^4$ | $5.865 \times 10^4$ | $7.907 \times 10^4$ | $1.185 \times 10^5$ | 26.5 | 1.466 |
| Ex. 15 | 20 | 0.1246 ± 0.0012 | $8.740 \times 10^4$ | $1.020 \times 10^5$ | $1.085 \times 10^5$ | $1.472 \times 10^5$ | 20.1 | 1.241 |
| Ex. 16 | 40 | 0.1284 ± 0.0007 | $8.458 \times 10^4$ | $9.391 \times 10^4$ | $1.016 \times 10^5$ | $1.425 \times 10^5$ | 21.9 | 1.202 |
| Ex. 17 | 50 | 0.1390 ± 0.0002 | $8.769 \times 10^4$ | $9.258 \times 10^4$ | $1.037 \times 10^5$ | $1.433 \times 10^5$ | 21.3 | 1.183 |
| Ex. 18 | 5 | 0.1736 ± 0.0028 | $9.814 \times 10^4$ | $1.232 \times 10^5$ | $1.255 \times 10^5$ | $1.738 \times 10^5$ | 20.1 | 1.278 |

The data about the polymer was collected using the following method about the polyimide films.

(1) Apparatus and Method for Analyzing

GPC & MALS Analysis Apparatus: GPC—Water 1525 Binary HPLC pump; RI detector—Wyatt optilab rEX; MALS—Wyatt Dawn 8+; Column—use by connecting with Shodex K-803, K-804 and K-805

(2) Pretreatment Method of Sample 0.05 g of the films that were obtained were weighted and added in 10 ml vial of DMF (containing 0.05% LiCl). The solutions of DMF containing the films were added to an oven of 50° C. and dissolved for 2 hours while shaking. After completely dissolving the sample, it was filtered with 0.45 μm syringe filter and then installed to MALS autosample.

(3) Analysis Method

Injection volume: 400 μl
Injection Temp.: 50° C.
Flow Rate: 1 ml/min
Eluent: DMF (containing 0.05% LiCl, Refractive index 1.390)
Column Temp.: 50° C.
Dn/Dc: see the following description At this time, Dn/Dc relates to the specific refractive index increment, and is the value that a change rate of refractive index according to the change rate of dilute solution concentration is differentiated and is measured within the range of 0.001 to 0.1 g/ml that is a section of concentration change when detecting a refractive index through injecting the polyimide film in a state of dilute solution in an organic solvent inside flow cell of differential refractometer. Specifically, the above value was measured as the following method.

(4) Analysis Apparatus that is used for Measuring Dn/Dc

RI Detector: Wyatt Optilavb rEX (5) Pretreatment Method of Sample for Measuring Dn/Dc Firstly, 0.2 g of the polyimide films that were obtained were dissolved in 50 ml of DMF (containing 0.05% LiCl) to prepare a sample having a high concentration. At this time, because it was not easily dissolved, it was added to an oven of 50° C., and dissolved for about 2 hours while shaking. The samples having 0.0032 g/ml, 0.0024 g/ml, 0.0016 g/ml and 0.0008 g/a concentration, respectively were prepared by diluting the sample having a high concentration. For each sample, the refractive index values according to the concentration were measured using 0.45 μm syringe filter.

(6) Analysis Method of Dn/Dc Sample injection volumn: 10 ml
injector Temp.: 50° C.
flow rate: 16 ml/hr
eluent: DMF (containing 0.05% LiCl, Refractive index 1.390)

As the results obtained from the above analysis, in the case of the polyimide films that were obtained, Dn/Dc value was 0.1246±0.0012 at 50° C. of DMF (containing 0.05% LiCl).

The absolute molecular weight value according to MALS can be calculated according to the above method from Dn/Dc value that was obtained. The results were shown in the following Table 6.

Example 20

The film was obtained by using the same method with the above Example 19, but only the polyamic acid was produced and stirred for 5 hours, and then pyridine and acetic anhydride were added thereto.

The absolute molecular weight value according to MALS and Dn/Dc value about the obtained films can be calculated using the same method to Example 19. The results were shown in the following Table 6.

Example 21

The film was obtained by using the same method with the above Example 19, but only the polyamic acid was produced and stirred for 12 hours, and then pyridine and acetic anhydride were added thereto.

The absolute molecular weight value according to MALS and Dn/Dc value about the obtained films can be calculated using the same method to Example 19. The results were shown in the following Table 6.

Example 22

The film was obtained by using the same method with the above Example 19, but only the polyamic acid was produced and stirred for 24 hours, and then pyridine and acetic anhydride were added thereto.

The absolute molecular weight value according to MALS and Dn/Dc value about the obtained films can be calculated using the same method to Example 19. The results were shown in the following Table 6.

Example 23

While a nitrogen was passing through 1 L reactor comprising a stirrer, a nitrogen injector, a dropping funnel, a thermostat and a cooler as a reactor, 587.54 g of N,N-dimethylacetamide (DMAc) was filled into the reactor, and then the temperature of the reactor was adjusted at 25° C. And then, 64.046 g (0.2 mol) of TFDB was dissolved and maintained at 25° C. To the reactor, 11.76 g (0.04 mol) of BPDA was added and stirred for 1 hour to completely dissolve BPDA. At this time, the temperature of the solution was maintained at 25° C. And, 71.08 g (0.16 mol) of 6FDA was added and then the solution of the polyamic acid having the solid concentration of 20 wt % was obtained.

The solution of the polyamic acid was stirred at a room temperature for 1 hours; 31.64 g of pyridine and 40.91 g of acetic anhydride were injected and stirred for 30 minutes; and then after again stirring at 80° C. for 1 hour, it is cooled at a room temperature; it was slowly injected to the container containing 20 L of methanol to precipitate; the precipitated solid was filtered and grinded; and then dried at 80° C. in vacuum for 6 hours to obtain 90 g of the solid powder (the degree of imidization was 82%).

The solid powder obtained from the above method was dissolved in 360 g of N,N-dimethylacetamide (DMAc) to obtain 20 wt % of the solution (viscosity: 70 poise).

After finishing the reaction, the obtained solution was applied to a stainless board and then cast in 700 μm; after drying for 1 hour with a hot-air of 150° C., the film was detached from the stainless board and then fixed in a frame with a pin.

After the frame fixed with the film was added to the vacuum oven and slowly heated for 2 hours from 100° C. to 300° C., it was slowly cooled to remove from the frame to obtain the polyimide film. And then, it was again heated for 30 minutes at 300° C. to obtain the polyimide film as the final heating (thickness: 100 μm, and the degree of imidization: 95%).

The absolute molecular weight value according to MALS and Dn/Dc value about the obtained films can be calculated using the same method to Example 19. The results were shown in the following Table 6.

Example 24

The film was obtained by using the same method with the above Example 23, but only the polyamic acid was produced and stirred for 12 hours, and then pyridine and acetic anhydride were added thereto.

The absolute molecular weight value according to MALS and Dn/Dc value about the obtained films can be calculated using the same method to Example 19. The results were shown in the following Table 6.

Example 25

The film was obtained by using the same method with the above Example 23, but only the polyamic acid was produced and stirred for 24 hours, and then pyridine and acetic anhydride were added thereto.

The absolute molecular weight value according to MALS and Dn/Dc value about the obtained films can be calculated using the same method to Example 19. The results were shown in the following Table 6.

TABLE 6

|  | Dn/Dc | Mn (g/mol) | Mp (g/mol) | Mw (g/mol) | Mz (g/mol) | Rz (nm) | Polydispersity |
|---|---|---|---|---|---|---|---|
| Ex. 19 | 0.1246 ± 0.0012 | $1.249 \times 10^4$ | $1.709 \times 10^4$ | $1.845 \times 10^4$ | $4.716 \times 10^4$ | — | 1.478 |
| Ex. 20 | 0.1246 ± 0.0012 | $2.556 \times 10^4$ | $2.929 \times 10^4$ | $3.290 \times 10^4$ | $3.133 \times 10^5$ | 34.7 | 1.287 |
| Ex. 21 | 0.1246 ± 0.0012 | $4.767 \times 10^4$ | $5.785 \times 10^4$ | $5.942 \times 10^4$ | $1.145 \times 10^5$ | 25 | 1.246 |
| Ex. 22 | 0.1246 ± 0.0012 | $3.430 \times 10^4$ | $4.524 \times 10^4$ | $4.493 \times 10^4$ | $8.112 \times 10^4$ | 22.6 | 1.310 |
| Ex. 23 | 0.1246 ± 0.0012 | $1.803 \times 10^4$ | $2.363 \times 10^4$ | $2.395 \times 10^4$ | $3.161 \times 10^4$ | 12.9 | 1.328 |
| Ex. 24 | 0.1246 ± 0.0012 | $9.427 \times 10^4$ | $1.098 \times 10^5$ | $1.162 \times 10^5$ | $1.575 \times 10^5$ | 25.2 | 1.232 |
| Ex. 25 | 0.1246 ± 0.0012 | $7.268 \times 10^4$ | $8.199 \times 10^4$ | $8.805 \times 10^4$ | $1.199 \times 10^5$ | 19.5 | 1.212 |

From the above Table 6, it could be expected that the absolute molecular weights in the case of the films according to Example 19 and Example 23 are excessively small so that their degrees of yellowness would be slightly high from the result of Table 3.

The invention claimed is:

1. A polyimide film obtained from an imide of polyamic acid, said polyamic acid being obtained by polymerizing diamines and acid dianhydrides, wherein an absolute molecular weight is 30,000 to 170,000, and the absolute molecular weight is determined by the following Formula 1:

$$\frac{R_\theta}{K^*c} = MP(\theta) - 2A_2cM^2P^2(\theta) \qquad \text{Formula 1}$$

wherein, $R_\theta$ is the excess Rayleigh ratio;
$K^* = 4\pi^2 n_0^2 (dn/dc)^2 \lambda_0^{-4} N_A^{-1}$, wherein $n_0$ is a refractive index of solvent, $N_A$ is Avogadro's number, and dn/dc is a specific refractive index increment, that is differentiated from a change rate of refractive index changed according to a change rate of concentration of dilute solution and is determined within the range of 0.001 to 0.1 g/ml as a concentration change section, when a refractive index is detected by injecting a polyimide film in a state of dilute solution in an organic solvent into a flow cell of differential refractometer;
c is a polymer concentration (g/ml) in a solution;
M is molar mass, and weight average molecular weight (Mw) in the case of polydisperse sample;
$A_2$ is the second virial coefficient; and
$P(\theta) = R_\theta / R_0$, wherein said acid dianhydrides comprise (i) 2,2-bis(3,4-dicarboxyphenyl)hexafluoropropane dianhydride, and (ii) at least one selected from the group consisting of 4-(2,5-dioxotetrahydrofuran-3-yl)-1,2,3,4-tetrahydronaphthalene-1,2-dicarboxylic anhydride, 4,4'-(4,4'-isopropylidenediphenoxy)bis(phthalic anhydride), pyromellitic dianhydride, biphenyltetracarboxylic dianhydride, and oxyphthalic dianhydride;
2,2-bis(3,4-dicarboxyphenyl)hexafluoropropane dianhydride is introduced to a polymerization mixture last in the order of introducing the acid dianhydrides; and
wherein the polyimide film is obtained by further heating after making film.

2. The polyimide film according to claim 1, wherein the imide of polyamic acid is obtained by imidization of the polyamic acid and the degree of imidization is at least 95%.

3. The polyimide film according to claim 1, wherein the absolute molecular weight is 50,000 to 150,000.

4. The polyimide film according to claim 1, wherein a polydispersity index of the absolute molecular weight is 1.1 to 1.6.

5. The polyimide film according to claim 4, wherein the polydispersity index of the absolute molecular weight is 1.1 to 1.3.

6. The polyimide film according to claim 1, wherein the diamines include 2,2'-bis(trifluoromethyl)-4,4'-diaminobiphenyl.

7. The polyimide film according to claim 6, wherein 2,2'-bis(trifluoromethyl)-4,4'-diaminobiphenyl is included in 20 mol % to 100 mol % in the diamines.

8. The polyimide film according to claim 1, wherein the polymerization is performed for 1 hour to 24 hours.

9. The polyimide film according to claim 8, wherein the polymerization is performed for 8 hours to 12 hours.

10. The polyimide film according to claim 1, wherein a degree of yellowness of the polyimide film is not more than 4.5 based on a film thickness of 50-100 μm.

11. The polyimide film according to claim 1, wherein a mean coefficient of linear thermal expansion of the polyimide film is not more than 70 ppm/° C., measured within the range of 50 to 250° C. using a mechanical thermal analysis based on a film thickness of 50-100 μm.

12. A method for producing a polyimide film, comprising:
obtaining a polyamic acid solution by polymerizing diamines and acid dianhydrides in an organic solvent;
producing a solution containing imides by an imidization of the polyamic acid at an imidization degree of at least 80% by injecting a chemical conversion agent to the polyamic acid solution;
precipitating by adding a solvent selected from methyl alcohol, ethyl alcohol, isopropyl alcohol, ethylene glycol, triethylene glycol, 2-butyl alcohol, 2-propyl alcohol, 2-hexyl alcohol, cyclopentyl alcohol, cyclohexyl alcohol, phenol, and t-butyl alcohol to the solution containing imides;

filtering solids precipitated from the above step;
obtaining a polyimide powder by drying a filtrate;
dissolving the polyimide powder in an organic solvent;
making a film with the polyimide solution; and
heating the film at 100 to 500° C.;
wherein the polyimide film has an absolute molecular weight (Mw) of 30,000 to 170,000, determined by the following Formula 1:

$$\frac{R_\theta}{K^*c} = MP(\theta) - 2A_2cM^2P^2(\theta) \qquad \text{Formula 1}$$

wherein, $R_\theta$ is the excess Rayleigh ratio;
$K^*=4\pi^2n_0^2(dn/dc)^2\lambda_0^{-4}N_A^{-1}$, here $n_0$ is a refractive index of solvent, $N_A$ is Avogadro's number, and do/dc is a specific refractive index increment, that is differentiated from a change rate of refractive index changed according to a change rate of concentration of dilute solution and is determined within the range of 0.001 to 0.1 g/ml as a concentration change section, when a refractive index is detected by injecting a polyimide film in a state of dilute solution in an organic solvent into a flow cell of differential refractometer;
c is a polymer concentration (g/ml) in a solution;
M is molar mass, and weight average molecular weight (Mw) in the case of polydisperse sample;
$A_2$ is the second virial coefficient; and
$P(\theta)=R_\theta/R_0$,
wherein said acid dianhydrides comprise (i) 2,2-bis(3,4-dicarboxyphenyl)hexafluoropropane dianhydride, and (ii) at least one selected from the group consisting of 4-(2,5-dioxotetrahydrofuran-3-yl)-1,2,3,4-tetrahydronaphthalene-1,2-dicarboxylic anhydride, 4,4'-(4,4'-isopropylidenediphenoxy)bis(phthalic anhydride), pyromellitic dianhydride, biphenyltetracarboxylic dianhydride, and oxyphthalic dianhydride; and
2,2-bis(3,4-dicarboxyphenyl)hexafluoropropane dianhydride is introduced to a polymerization mixture last in the order of introducing the acid dianhydrides.

13. The method for producing the polyimide film according to claim 12, wherein the chemical conversion agent includes a dehydrating agent and catalyst.

* * * * *